United States Patent
Vigna et al.

(10) Patent No.: US 6,546,799 B1
(45) Date of Patent: *Apr. 15, 2003

(54) METHOD FOR COMPENSATING THE POSITION OFFSET OF A CAPACITIVE INERTIAL SENSOR, AND CAPACITIVE INERTIAL SENSOR

(75) Inventors: Benedetto Vigna, Pietrapertosa (IT); Alberto Gola, Montu' Beccaria (IT); Sarah Zerbini, Fontanellato (IT); Dario Cini, deceased, late of Cornaredo (IT), by Carlo Cini, executor

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,294

(22) Filed: Sep. 8, 2000

(30) Foreign Application Priority Data

Sep. 10, 1999 (EP) .............................. 99830568

(51) Int. Cl.⁷ .............................................. G01P 15/00
(52) U.S. Cl. .................................. 73/514.01; 73/504.12
(58) Field of Search ........................ 73/504.14, 504.02, 73/504.03, 504.04, 504.08, 504.09, 504.12, 504.13, 514.32, 514.01, 514.02, 1.37, 1.38

(56) References Cited

U.S. PATENT DOCUMENTS

| 5,025,346 A | 6/1991 | Tang et al. ............... 361/283 |
| 5,565,625 A | 10/1996 | Howe et al. ............. 73/514.16 |
| 5,618,989 A | 4/1997 | Marek ........................ 73/1.38 |
| 5,650,568 A * | 7/1997 | Greiff et al. ............. 73/504.09 |
| 5,869,760 A * | 2/1999 | Geen ....................... 73/504.12 |
| 5,911,157 A | 6/1999 | Biebl ...................... 73/514.16 |
| 6,257,062 B1 * | 7/2001 | Rich ........................ 73/514.32 |
| 6,370,954 B1 * | 4/2002 | Zerbini et al. ........... 73/514.01 |

FOREIGN PATENT DOCUMENTS

| WO | 86/00416 | 1/1986 |
| WO | 97/45699 | 12/1997 |

OTHER PUBLICATIONS

Kuehnel, Wolfgang, Modelling of the mechanical behavior of a differential capacitor acceleration sensor, Sensors and Actuators A 48 (1995). Nov. 29, 1994: pp. 101–108.

* cited by examiner

*Primary Examiner*—Helen Kwok
(74) *Attorney, Agent, or Firm*—Lisa K. Jorgenson; E. Russell Tarleton; Seed IP Law Group PLLC

(57) ABSTRACT

An inertial sensor having a stator and a rotor made of semiconductor material and electrostatically coupled together, and a microactuator also made of semiconductor material, coupled to the rotor and controlled so as to move the rotor itself and thus compensate for the position offset thereof.

25 Claims, 3 Drawing Sheets

METHOD FOR COMPENSATING THE POSITION OFFSET OF A CAPACITIVE INERTIAL SENSOR, AND CAPACITIVE INERTIAL SENSOR

TECHNICAL FIELD

The present invention regards a method for compensating the position offset of a capacitive inertial sensor, and a capacitive inertial sensor.

BACKGROUND OF THE INVENTION

As is known, owing to their reduced size, excellent technical characteristics, high reliability, and low cost, integrated capacitive inertial sensors manufactured using the micromachining technique are progressively laying claim to market segments up to now occupied by conventional inertial sensors. One of the main applications of the above inertial sensors is in the field of airbag systems for motor vehicles as a means for measuring the deceleration to which a motor vehicle is subjected upon impact.

To provide an example, FIG. 1 presents the structure of an integrated rotary inertial sensor of a known type.

The inertial sensor, indicated as a whole by 1, is made of semiconductor material, has a circular structure, and comprises an inner stator 2, which is integral with the die 3 in which the inertial sensor 1 is formed, and an outer rotor 4, which is electrostatically coupled to the stator 2.

The rotor 4 comprises a suspended mass 6 having an annular shape, a plurality of mobile arms 8, extending radially towards the stator 2 from the suspended mass 6, identical to each other and angularly equispaced, and elastic-suspension and anchorage elements 10 (represented schematically as springs) elastically connecting the suspended mass 6 to fixed anchoring and biasing regions 12, through which the suspended mass 6 and the mobile arms 8 are biased (typically at a potential of 1.5 V).

The stator 2 comprises a plurality of pairs of fixed arms 14, 16, one for each mobile arm 8 of the rotor 4, which extend radially with respect to the suspended mass 6 towards the suspended mass 6. They are arranged in such a way that between each pair of fixed arms 14, 16, a corresponding mobile arm 14 of the rotor 4 is arranged and are connected to respective fixed anchoring and biasing regions 18, 20, through which the fixed arms 14, 16 are biased (typically at a potential ranging between 1.5 and 2.2 V).

The fixed arms 14, 16 are connected, via the fixed anchoring and biasing regions 18, 20, to a measuring circuit having the purpose of measuring the acceleration or deceleration to which the inertial sensor 1 is subjected.

In particular, the inertial sensor 1 can be electrically modeled as shown in FIG. 2, i.e., by means of two capacitive elements 21, 22 connected in series, wherein the two outer plates are defined by the fixed arms 14 and 16, respectively, of the stator 2, and the two inner plates are defined by the mobile arms 8 of the rotor 4, which although they are illustrated as being separate, in fact constitute a single plate.

The rotational motion of the rotor 4 determines a modulation in phase opposition of the capacitances of the capacitive elements 21, 22, which should assume, in the absence of acceleration or deceleration applied to the inertial sensor 1, equal values. Consequently, by measuring these capacitances, it is possible to detect the unknown inertial quantity, i.e., the acceleration or deceleration to which the inertial sensor 1 is subjected.

It is also known, however, that, on account of the imperfect configuration of the elastic-suspension and anchoring elements 10 and on account of the residual mechanical stress of the material of which the inertial sensor 1 is made, the rotor 4 is generally affected by a position offset; i.e., the effective zero position of the rotor 4 does not coincide with the nominal zero position envisaged in the design phase.

The position offset consequently gives rise to a corresponding capacitive offset, defined as the difference between the capacitances of the capacitive elements 21, 22 in the absence of acceleration or deceleration, which has an adverse effect on the overall performance of the system comprising the inertial sensor 1 and the corresponding driving and measuring circuitry.

A known technique used for compensating the aforesaid capacitive offset involves the use, within the measuring circuit, of regulatable compensation capacitors, which are connected in parallel to the capacitive elements 21, 22 and have the purpose of compensating the differences which, in the absence of acceleration or deceleration, the capacitances of the said capacitive elements 21, 22 present as compared to the nominal values which they ought to assume in the absence of position offset. In this way, then, even in the presence of a capacitive offset, the equivalent capacitances measured by the measuring circuit in static conditions, i.e., in the absence of acceleration or deceleration, again assume the same value.

This technique presents, however, the drawback of compensating the capacitive offset only under static conditions, i.e., in the absence of acceleration or deceleration applied to the inertial sensor, but not under dynamic conditions, i.e., in the presence of acceleration or deceleration applied to the inertial sensor, and this is typically a cause of errors in the measurement of the unknown inertial quantity.

In fact, after the compensation performed as described above, the rotor 4 continues in any case to assume a zero position that is not the nominal one, and because of the position offset the application of an acceleration or deceleration to the inertial sensor 1 does not bring about any modulation in phase opposition of the capacitances of the capacitive elements 21, 22 that occurs in the absence of position offset, but causes asymmetrical variations of these capacitances which depend both on the direction of rotation of the rotor 4 and on the amount of the position offset; these variations consequently lead to measuring errors.

SUMMARY OF THE INVENTION

The present invention provides a method for compensating the offset and a capacitive inertial sensor that is free from the drawbacks of the known art.

According to the disclosed embodiments of the present invention, the inertial sensor is made of semiconductor material and comprises a stator element and a rotor element electrostatically coupled together and an actuator made of semiconductor material coupled to the rotor element and controlled to compensate the position offset of the rotor element with respect to the stator element.

In accordance with another aspect of the present invention, an inertial sensor is provided that includes a sensor element having a stator and a rotor, and an actuator formed on the sensor element, the actuator comprising a fixed arm connected to one of the stator and the rotor and a mobile arm connected to the other of the stator and the rotor, the actuator configured to adjust the positions of the stator and the rotor relative to one another in response to a driving signal.

In accordance with another aspect of this embodiment of the invention, a driver circuit is provided that is coupled to the sensor element and the actuator and configured to determine a position offset of the stator and rotor relative to one another and to generate the driving signal in response thereto.

In accordance with yet another embodiment of the present invention, a method for compensating the position offset of an inertial sensor made of semiconductor material and having a stator element and a rotor element electrostatically coupled together is provided. The method includes moving the rotor element relative to the stator element to compensate for the position offset thereof.

In accordance with another aspect of the method of the present invention, the moving of the rotor includes driving at least one actuator element made of semiconductor material coupled to the rotor element. More particularly, driving includes applying a potential difference between a mobile arm and a fixed arm in the actuator element.

BRIEF DESCRIPTION OF THE DRAWINGS

For a better understanding of the present invention, two preferred embodiments thereof are now described, merely to provide non-limiting examples, with reference to the attached drawings, in which.

DETAILED DESCRIPTION OF THE INVENTION

Figures 1, 2:
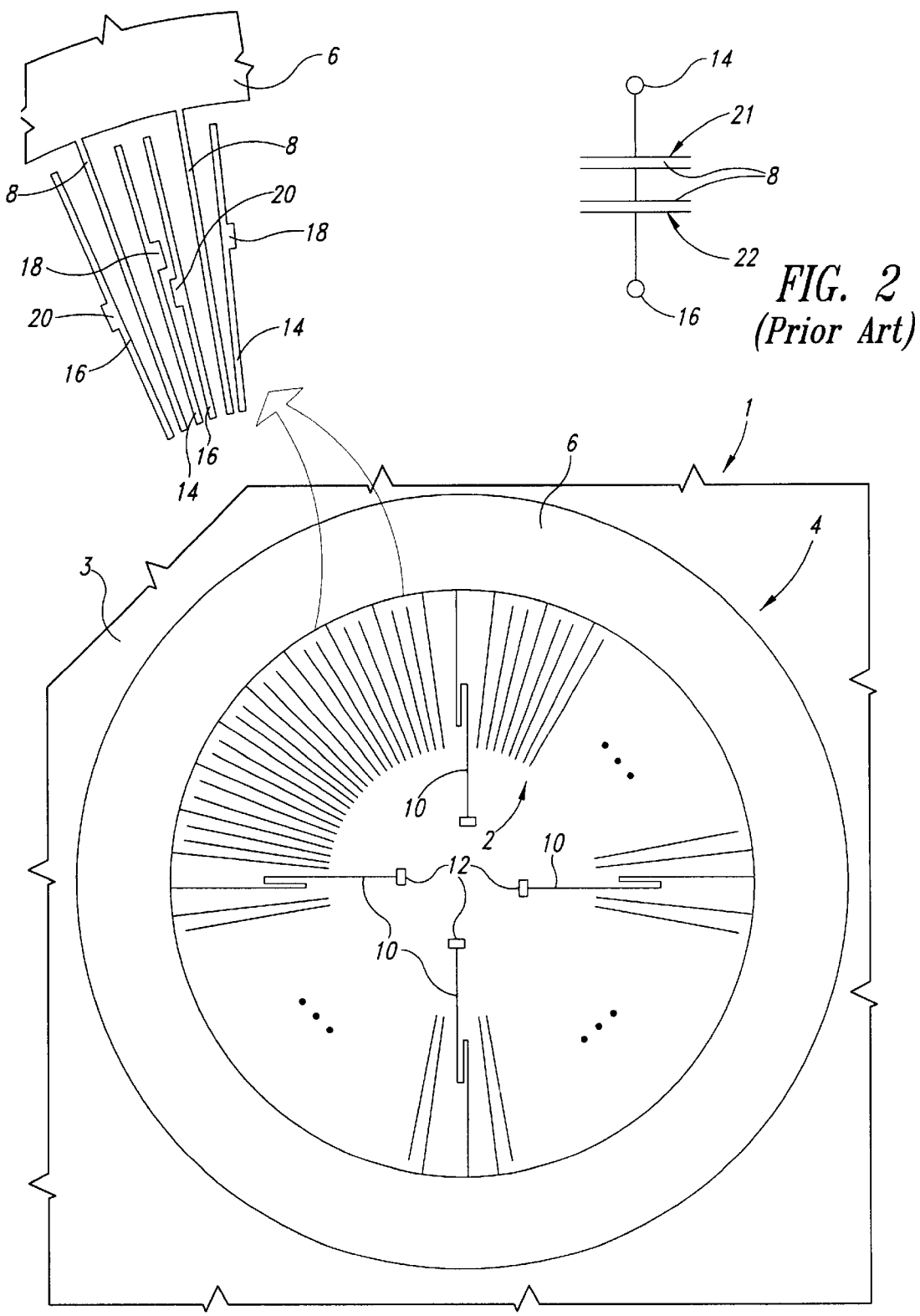
FIG. 1 is a schematic representation of the structure of a known rotary capacitive inertial sensor.
FIG. 2 presents an equivalent electrical diagram of the inertial sensor of FIG. 1.
Figure 3:
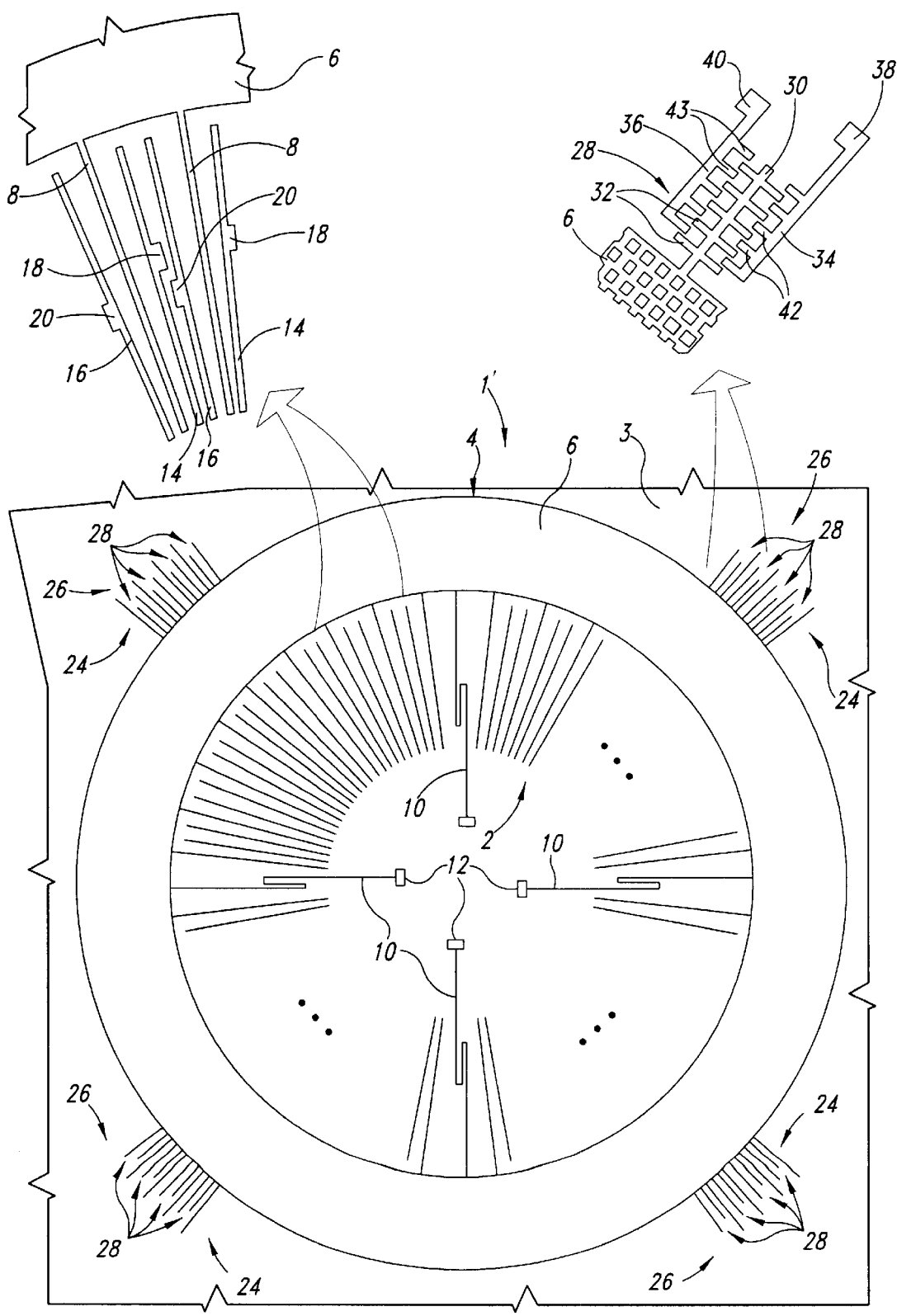
FIG. 3 is a schematic representation of the structure of a rotary capacitive inertial sensor according to the present invention.

In FIG. 3 an inertial sensor according to the present invention is designated, as a whole, by 1', wherein the parts that are identical to those of the capacitive inertial sensor 1 of FIG. 1 are designated by the same reference numbers.

The inertial sensor 1' has a structure similar to that of the inertial sensor 1 and differs from the latter in that it further comprises an integrated microactuator 24 made of semiconductor material, coupled to the rotor 4 and having the purpose of rotating the rotor 4 by an amount equal to the position offset to bring it back into the nominal zero position.

In particular, the microactuator 24 comprises four distinct actuator groups 26, each of which is arranged in a respective quadrant of the inertial sensor 1' and is formed of a plurality of actuator elements 28, numbering four in the example illustrated in FIG. 3, identical to one another and angularly equispaced.

In detail, each actuator element 28 comprises a mobile arm 30 integral with the suspended mass 6 of the rotor 4 (and consequently biased at the same potential as that of the suspended mass 6), extending radially outwards from the suspended mass 6, and carrying a plurality of mobile electrodes 32 extending from either side of the respective mobile arm 30 in a substantially circumferential direction and arranged parallel to one another and equispaced along the respective mobile arms 30.

Each actuator element 28 further comprises a pair of fixed arms 34, 36 extending radially with respect to the suspended mass 6, arranged on opposite sides of, and facing, the respective mobile arm 30, connected to respective fixed anchoring and biasing regions 38, 40, through which the fixed arms 34, 36 are biased (typically at a potential ranging between 1.5 and 5 V). Each of the fixed arms 34, 36 carries a plurality of fixed electrodes 42, 43 extending in a substantially circumferential direction towards the respective mobile arm 30 and interleaved, or "comb-finger" shaped, with the mobile electrodes 32 of the respective mobile arm 30.

In addition, the actuator elements 28 are defined on the wafer together with the suspended mass 6 of the rotor 4, and consequently do not require additional fabrication phases other than those already envisaged for the fabrication of the inertial sensor 1'.

Figure 4:
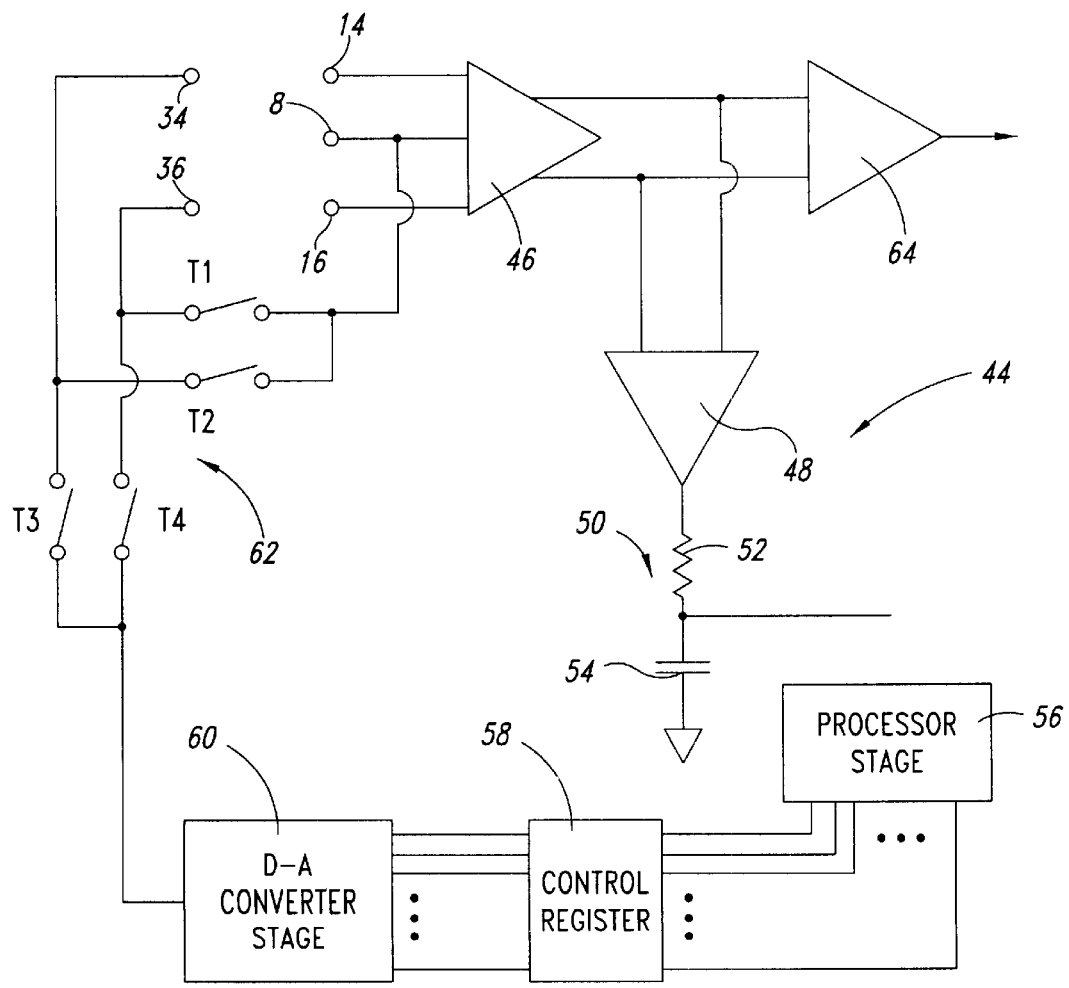
FIG. 4 is a schematic representation of a control circuit for the inertial sensor of FIG. 3.

The fixed arms 34, 36 of the actuator elements 28 are connected, through the fixed anchoring and biasing regions 38, 40, to a driving circuit 44—shown in FIG. 4 and described in detail in what follows—having the purpose of applying a biasing voltage to either one or the other of the two fixed arms 34, 36 of each actuator element 28 in such a way that the potential difference between the fixed arm 34, 36 thus biased and the corresponding mobile arm 30 causes a rotation of the rotor 4 in one direction or the other, sufficient for bringing the rotor 4 back into the nominal zero position.

In particular, as a result of the electrostatic coupling existing between each mobile arm 30 and the corresponding fixed arms 34, 36, the rotor 4 is subjected to a transverse force proportional to the number of pairs of fixed arms and mobile arms 30, 34, 36. This force tends to move the mobile arm 30 away from the fixed arm 34, 36, with respect to which the mobile arm 30 has a smaller potential difference, and to bring the mobile arm 30 closer to the fixed arm 34, 36, with respect to which the mobile arm 30 has a greater potential difference, thus causing rotation of the suspended mass 6.

Owing to the presence of the comb-finger shaped electrodes 32, 42, 43, the force necessary to bring the rotor 4 back from the effective zero position to the nominal zero position is altogether independent of the amount of offset with respect to the nominal zero position itself.

In addition, the microactuator 24 does not interfere with the operation of the inertial sensor 1' in that the phenomenon known as "electrostatic softening" is not present; i.e., the microactuator 24 does not modify the mechanical rigidity of the system. Furthermore, there is no interference between the capacitances defined by the fixed arms 34, 36 and corresponding mobile arms 30 of the actuator element 28 and the capacitances defined by the fixed arms 14, 16 and corresponding mobile arms 8 of the stator 2 and rotor 4.

FIG. 4 is a schematic representation of the circuit structure of the driving circuit 44 for the actuator elements 28.

The driving circuit 44 comprises a differential preamplifier stage 46 having a first input connected to the fixed arms 14 of the stator 2, a second input connected to the fixed arms 16 of the stator 2, a third input connected to mobile the arms 8 of the rotor 4, and a first and a second output providing a first and, respectively, a second signal indicating the values of the capacitances of the capacitive elements 21, 22, respectively, previously referred to and defined by the fixed arms 14, 16 with respect to the mobile arms 8; an amplifier stage 48 having a first and a second input connected to the outputs of the preamplifier stage 46, and an output providing a third signal indicating the unbalancing, i.e., the difference, between the aforesaid capacitances; and a first-order low-pass filtering network 50 formed of a resistor 52 and a capacitor 54 connected in series, and having an output node (node intermediate between the resistor 52 and the capacitor 54) on which there is present a fourth signal having a value equal to the mean value of the third signal, and thus having an amplitude proportional to the position offset.

The driving circuit 44 further comprises a processing stage 56 having an input connected to the output of the filtering network 50 and providing, on an output, an nbit digital correction word, for example with n=6, indicating the compensation potential to be applied to the fixed arms 34, 36 of the actuator elements 28 to compensate the position offset of the rotor 4. This word is stored in a control register 58 connected to the output of the processing stage 56.

In particular, the correction word is generated by implementing a simple algorithm which calculates the difference between the amplitude of the fourth signal, proportional to the position offset of the rotor 4, and a reference amplitude indicating the amplitude that the fourth signal would assume in the absence of position offset and converts the difference thus obtained into the digital correction word.

In addition, the processing stage 56 could alternatively be a stage external to the driving circuit and could form part of the machine performing the testing operation on the inertial sensor 1', and in this case the compensation of the position offset would be made only once during the testing phase, or it could be a stage internal to the driving circuit 44, and in this case the compensation of the position offset could be made continuously; in this latter way, also possible drifts of the position offset over time could be compensated.

The driving circuit 44 further comprises a digital-to-analog converter stage 60 having n inputs connected to the outputs of the control register 58 and an output supplying the compensation potential to be applied to the fixed arms 34, 36 of the actuator elements 28; and a connection stage 62 arranged between the output of the digital-toanalog converter stage 60 and the fixed arms 34, 36 of the actuator elements 28 and having the purpose of selectively connecting the fixed arms 34, 36 that are to be biased to the output of the digital-to-analog converter 60.

In particular, FIG. 4 shows only one part of the connection stage 62 for just one actuator element 28 and, as illustrated, for each pair of fixed arms 34, 36 to be biased, the connection stage 62 comprises two pairs of controlled switches T1, T2, T3, T4, made, for example, using MOS transistors.

In particular, the switches T3 and T4 are connected between the output of the digital-to-analog converter stage 60 and the corresponding fixed arms 34, 36, and are controlled in phase opposition so as to connect the output of the digital-to-analog converter stage 60 to only one of the two fixed arms 34, 36, whilst the switches T1 and T2 are connected between the third terminal of the preamplifier stage 46 and the fixed arms 34, 36 and are also controlled in phase opposition so as to bias the fixed arm 34, 36 that is not connected to the output of the digital-to-analog converter stage 60 at the same potential at which the mobile arms 14, 16 of the rotor 4 are biased.

Furthermore, connected to the outputs of the preamplifier stage 46 are a first and a second input of a preprocessing stage 64 having the purpose of processing, under normal operating conditions, the first and the second signal provided by the preamplifier stage 46, in a way which is known and hence not described in detail, so as to supply information on the acceleration or deceleration to which the inertial sensor 1' is subjected.

The advantages of the inertial sensor 1' according to the present invention are evident from the above description.

In particular, it is emphasized that the construction of the microactuator 24 dedicated to effecting the movement of the rotor 4 to bring it back into the nominal zero position does not involve additional phases in the process of fabrication of the inertial sensor 1' and does not interfere in any way with the operation of the said inertial sensor 1'.

Finally, it is clear that modifications and variations may be made to the inertial sensor 1' described and illustrated herein, without thereby departing from the scope of protection of the present invention.

For example, the number of actuator groups 26 and the number of actuator elements 28 in each actuator group 26 could be different from what has been described. In particular, even a single actuator element 28 connected to the suspended mass 6 could be envisaged, or else four actuator elements 28, each arranged in its respective quadrant, or two actuator elements 28 arranged on diametrically opposite sides of the suspended mass 6, or two actuator groups 26 arranged on diametrically opposite sides of the suspended mass 6.

Figure 5:
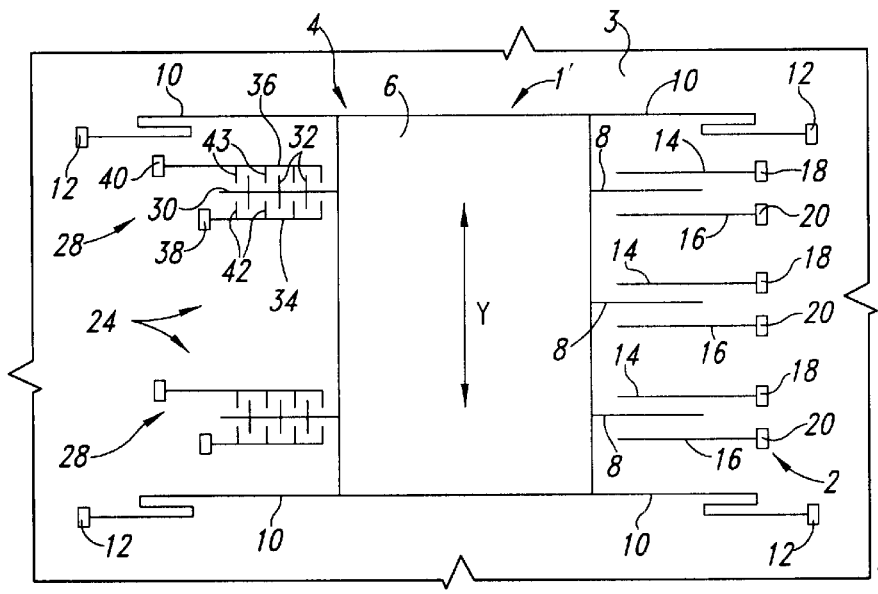
FIG. 5 is a schematic representation of the structure of a linear capacitive inertial sensor according to the present invention.

In addition, the inertial sensor 1' could be of the linear type, as represented in FIG. 5, in which the various parts of the inertial sensor are designated by the same reference numbers as those used in FIG. 3. In this case, the microactuator 24 is driven in such a way as to impress on the mobile mass 6 a translational motion with respect to the stator along a direction Y, and the mobile and fixed electrodes 32, 42, 43 are parallel to the direction Y.

Although representative embodiments of the invention have been illustrated and described, it is to be understood that various changes may be made therein without departing from the spirit and scope of the invention. Thus, the invention is to be limited only by the claims that follow and the equivalents thereof.

What is claimed is:

1. An inertial sensor made of semiconductor material, comprising a stator element and a rotor element electrostatically coupled together; and an actuator made of semiconductor material, coupled to said rotor element and controlled so as to compensate a position offset of the rotor element.

2. The inertial sensor of claim 1, wherein said actuator means comprise at least an actuator element comprising a first mobile arm extending from said rotor element and at least a first fixed arm facing said first mobile arm.

3. The inertial sensor of claim 2, wherein said first mobile arm is provided with a plurality of mobile electrodes extending transversely with respect to the first mobile arm towards said first fixed arm; and wherein said first fixed arm is provided with a plurality of fixed electrodes extending transversely with respect to said first fixed arm towards said first mobile arm.

4. The inertial sensor of claim 3, wherein said mobile electrodes are arranged parallel to one another along said first mobile arm and in that said fixed electrodes are arranged parallel to one another along said first fixed arm and are interleaved with said mobile electrodes.

5. The inertial sensor of claim 2, wherein said actuator element comprises a pair of said first fixed arms arranged on opposite sides of said first mobile arm.

6. The inertial sensor of claim 2, wherein said actuator comprises a plurality of actuator elements.

7. The inertial sensor of claim 6, wherein said rotor element has a circular structure and said actuator comprises at least one pair of said actuator elements arranged on diametrically opposite sides of said rotor element.

8. The inertial sensor of claim 7, wherein said actuator comprise two actuator groups, each actuator group formed of at least two said actuator elements and arranged on diametrically opposite sides of said rotor element.

9. The inertial sensor of claim 6, wherein said rotor element has a circular structure and said actuator comprises four said actuator elements, each actuator element arranged in a respective quadrant of said rotor element.

10. The inertial sensor of claim 9, wherein said actuator comprises four actuator groups, each actuator group formed of at least two said actuator elements and each actuator group arranged in a respective quadrant of said rotor element.

11. The inertial sensor of claim 2, wherein said rotor element comprises a suspended mass and a plurality of second mobile arms extending from said suspended mass, and said stator element comprises a plurality of second fixed arms, each facing a respective said second mobile arm.

12. The inertial sensor of claim 11, wherein said stator element further comprises a plurality of third fixed arms, each facing a respective said second mobile arm, each second mobile arm being arranged between a respective second fixed arm and a respective third fixed arm.

13. A method for compensating the position offset of an inertial sensor made of semiconductor material and having a stator element and a rotor element electrostatically coupled together; comprising moving said rotor element to compensate for a positon offset thereof.

14. The method of claim 13, wherein said moving comprises driving at least one actuator element, made of semiconductor material, coupled to said rotor element.

15. The method of claim 14, the actuator element having a mobile arm extending from said rotor element and at least one fixed arm facing said mobile arm, wherein said driving comprisies applying a potential difference between said mobile arm and said fixed arm.

16. The method of claim 15, wherein said applying a potential difference comprises generating an unbalancing signal correlated to the position offset of said rotor element and generating said potential difference as a function of said unbalancing signal.

17. The method of claim 16, wherein said generating said potential difference comprises calculating a difference between said unbalancing signal and a reference signal and generating said potential difference as a function of said calculated difference.

18. The method of claim 17, wherein said generating said potential difference comprises generating a digital correction word as a function of said difference between said unbalancing signal and said reference signal, and carrying out a digital-to-analog conversion of said digital correction word.

19. An inertial sensor, comprising:

a sensor element, comprising:
 a stator;
 a rotor; and
 an actuator formed on the sensor element, the actuator comprising a fixed arm connected to one of the stator and the rotor and a mobile arm connected to the other of the stator and the rotor, the actuator configured to adjust positions of the stator and the rotor relative to one another in response to a driving signal.

20. The sensor of claim 19, further comprising a driver circuit coupled to the sensor element and the actuator and configured to determine a position offset of the stator and the rotor relative to one another and to generate the driving signal in response thereto.

21. The sensor of claim 20, wherein the stator and the rotor are configured to form a capacitive element that generate a first capacitive signal and a second capacitive signal, and wherein the driver circuit is coupled to the capacitive element and is configured to receive the first capacitive signal and the second capacitive signal and to generate a difference signal, the driver circuit further configured to compare the different signal to a reference signal and to generate the driving signal in response thereto.

22. The sensor of claim 20, wherein the stator and the rotor are configured to form a capacitive element that generate a first capacitive signal and a second capacitive signal, and wherein the driver circuit comprises a first amplifier stage coupled to the capacitive element and configured to receive the first and second capacitive signals and to generate first and second capacitive value signals; a second amplifier stage coupled to the first amplifier stage and configured to receive the first and second capacitive value signals and to generate a difference signal in response thereto.

23. The sensor of claim 22, wherein the driver circuit further comprises a processing stage coupled to the second amplifier and configured to receive the difference signal and to compare the difference signal to a reference signal and to generate a driver signal in response thereto.

24. The sensor of claim 23, wherein the driver circuit further comprises a filter network coupled between the second amplifier stage and the processing stage, the filter network configured to receive the difference signal from the second amplifier stage and to output a modified difference signal having a value equal to a mean value of the difference signal.

25. The sensor of claim 20, further comprising a connection stage coupled to the actuator and to the driver circuit, the connection stage configured to reactive the driving signal and to selectively couple the driving signal to the actuator in response to the driving signal.

* * * * *

UNITED STATES PATENT AND TRADEMARK OFFICE
CERTIFICATE OF CORRECTION

PATENT NO.     : 6,546,799 B1
DATED          : April 15, 2003
INVENTOR(S)    : Benedetto Vigna et al.

It is certified that error appears in the above-identified patent and that said Letters Patent is hereby corrected as shown below:

Column 6,
Lines 47 and 48, "said actuator means comprise at least" should read as -- said actuator comprise at least --.

Column 8,
Line 52, "to reactive the driving signal" should read as -- to receive the driving signal --.

Signed and Sealed this

Nineteenth Day of August, 2003

JAMES E. ROGAN
*Director of the United States Patent and Trademark Office*

(12) EX PARTE REEXAMINATION CERTIFICATE (10433rd)
United States Patent
Vigna et al.

(10) Number: US 6,546,799 C1
(45) Certificate Issued: *Dec. 12, 2014

(54) METHOD FOR COMPENSATING THE POSITION OFFSET OF A CAPACITIVE INERTIAL SENSOR, AND CAPACITIVE INERTIAL SENSOR

(75) Inventors: Benedetto Vigna, Pietrapertosa (IT); Alberto Gola, Montu' Beccaria (IT); Sarah Zerbini, Fontanellato (IT); Dario Cini, Cornaredo (IT); Carlo Cini, Cornaredo, executor (IT)

(73) Assignee: STMicroelectronics S.r.l., Agrate Brianza (IT)

Reexamination Request:
No. 90/012,520, Sep. 12, 2012

Reexamination Certificate for:
Patent No.: 6,546,799
Issued: Apr. 15, 2003
Appl. No.: 09/658,294
Filed: Sep. 8, 2000

Certificate of Correction issued Aug. 19, 2003

( * ) Notice: This patent is subject to a terminal disclaimer.

(30) Foreign Application Priority Data

Sep. 10, 1999 (EP) ..................................... 99830568

(51) Int. Cl.
*G01P 15/00* (2006.01)
(52) U.S. Cl.
USPC .................................... 73/514.01; 73/504.12
(58) Field of Classification Search
None
See application file for complete search history.

(56) References Cited

To view the complete listing of prior art documents cited during the proceeding for Reexamination Control Number 90/012,520, please refer to the USPTO's public Patent Application Information Retrieval (PAIR) system under the Display References tab.

*Primary Examiner* — My Trang Nu Ton

(57) ABSTRACT

An inertial sensor having a stator and a rotor made of semiconductor material and electrostatically coupled together, and a microactuator also made of semiconductor material, coupled to the rotor and controlled so as to move the rotor itself and thus compensate for the position offset thereof.

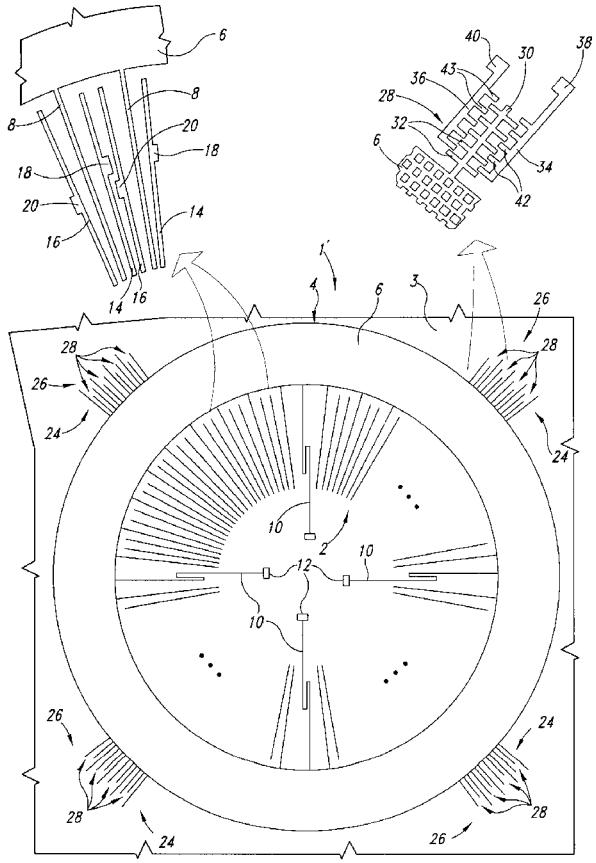

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2-12 and 15-23 is confirmed.

Claims 1 and 13-14 are cancelled.

New claims 26-35 are added and determined to be patentable.

Claims 24 and 25 were not reexamined.

26. *The inertial sensor of claim 1 wherein controlling said rotor element so as to compensate a position offset of the rotor element comprises rotating said rotor element from an effective zero position to a nominal zero position to compensate for a capacitive offset of the inertial sensor.*

27. *The method of claim 13 wherein moving said rotor element to compensate for a position offset thereof comprises rotating said rotor element from an effective zero position to a nominal zero position to compensate for a capacitive offset of the inertial sensor.*

28. *The inertial sensor of claim 19 wherein adjusting the positions of the stator and the rotor comprises rotating the rotor from an effective zero position to a nominal zero position to compensate for a capacitive offset of the inertial sensor.*

29. *The inertial sensor of claim 26 wherein said rotating said rotor from an effective zero position to a nominal zero position compensates for a capacitive offset of the inertial sensor under dynamic conditions.*

30. *The inertial sensor of claim 2 wherein said at least first fixed arm further comprises an anchoring region and biasing region for applying a biasing voltage to said first fixed arm to rotate said rotor element.*

31. *The inertial sensor of claim 20 wherein said fixed arm further comprises an anchoring region and biasing region for applying a biasing voltage to said first fixed arm in response to the driving signal to rotate said rotor.*

32. *The method of claim 18, wherein said generating said potential difference further comprises outputting the digital correction word to a connection stage comprising a plurality of switches, and controlling said switches in phase opposition so as to bias said mobile arm and said fixed arm.*

33. *An inertial sensor made of semiconductor material, comprising a stator element and a rotor element electrostatically coupled together; and an actuator made of semiconductor material, coupled to said rotor element and controlled so as to compensate a position offset of the rotor element; wherein the position offset is based, at least in part, on a difference between an effective zero position of said rotor element and a nominal zero position of said rotor element associated with a design for said inertial sensor.*

34. *A method for compensating the position offset of an inertial sensor made of semiconductor material and having a stator element and a rotor element electrostatically coupled together; comprising moving said rotor element to compensate for a position offset thereof; wherein the position offset is based, at least in part, on a difference between an effective zero position of said rotor element and a nominal zero position of said rotor element associated with a design for said inertial sensor.*

35. *The method of claim 34, wherein said moving comprises driving at least one actuator element, made of semiconductor material, coupled to said rotor element.*

\* \* \* \* \*